United States Patent
Bouvet et al.

(10) Patent No.: US 11,470,135 B2
(45) Date of Patent: Oct. 11, 2022

(54) METHOD FOR MANAGING A PLURALITY OF MEDIA STREAMS, AND ASSOCIATED DEVICE

(71) Applicant: Orange, Paris (FR)

(72) Inventors: Bertrand Bouvet, Châtillon (FR); Sébastien Prouvost, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/041,366

(22) PCT Filed: Mar. 21, 2019

(86) PCT No.: PCT/FR2019/050643
§ 371 (c)(1),
(2) Date: Sep. 24, 2020

(87) PCT Pub. No.: WO2019/186030
PCT Pub. Date: Oct. 3, 2019

(65) Prior Publication Data
US 2021/0044643 A1 Feb. 11, 2021

(30) Foreign Application Priority Data
Mar. 29, 2018 (FR) ...................................... 1852766

(51) Int. Cl.
*H04L 65/60* (2022.01)
*H04L 65/1069* (2022.01)

(52) U.S. Cl.
CPC .......... *H04L 65/60* (2013.01); *H04L 65/1069* (2013.01)

(58) Field of Classification Search
CPC ............................ H04L 65/60; H04L 65/1069
See application file for complete search history.

(56) References Cited

U.S. PATENT DOCUMENTS

| 10,250,924 B2 * | 4/2019 | Tsukagoshi ........ H04N 21/4343 |
| 2012/0170501 A1 * | 7/2012 | Drozt .................. H04W 72/005 370/312 |

(Continued)

FOREIGN PATENT DOCUMENTS

WO WO 2012/042150 A1 4/2012

OTHER PUBLICATIONS

Heinz, I.I., and Gerard, J., (2003). Priorities in stream transmission control protocol (sctp) multistreaming. Delaware Univ Newark Dept of Computer and Information Sciences.*

(Continued)

*Primary Examiner* — Kristie D Shingles
(74) *Attorney, Agent, or Firm* — Knobbe, Martens, Olson & Bear, LLP

(57) ABSTRACT

A method is provided for managing a plurality of media flows to be reproduced by a calling device prior to the finalization of the establishment of a communication. The method is implemented by the calling device prior to the finalization of the communication. The method includes sending a request for the creation of the communication to at least one called device. For each media stream of the plurality of media streams, a first degree of priority associated with the media stream is searched for in a message received in response to the request for creation of the communication. A media stream to be played is selected from the plurality of media streams, according to second degrees of priority associated with the media streams of the plurality of media streams, the second degrees of priority obtained according to the result of the search.

17 Claims, 8 Drawing Sheets

(56) References Cited

U.S. PATENT DOCUMENTS

2016/0164784 A1* 6/2016 Amemiya ............... H04L 47/29
                                                                   709/235
2016/0308915 A1  10/2016 Balasaygun et al.
2017/0034497 A1*  2/2017 Yahata ................. H04N 9/8233
2017/0310730 A1* 10/2017 Tamagnan .......... H04L 65/1006
2018/0351697 A1* 12/2018 Kim ..................... H04L 1/0058

OTHER PUBLICATIONS

International Search Report and Written Opinion dated May 17, 2019 for Application No. PCT/FR2019/050643.

* cited by examiner

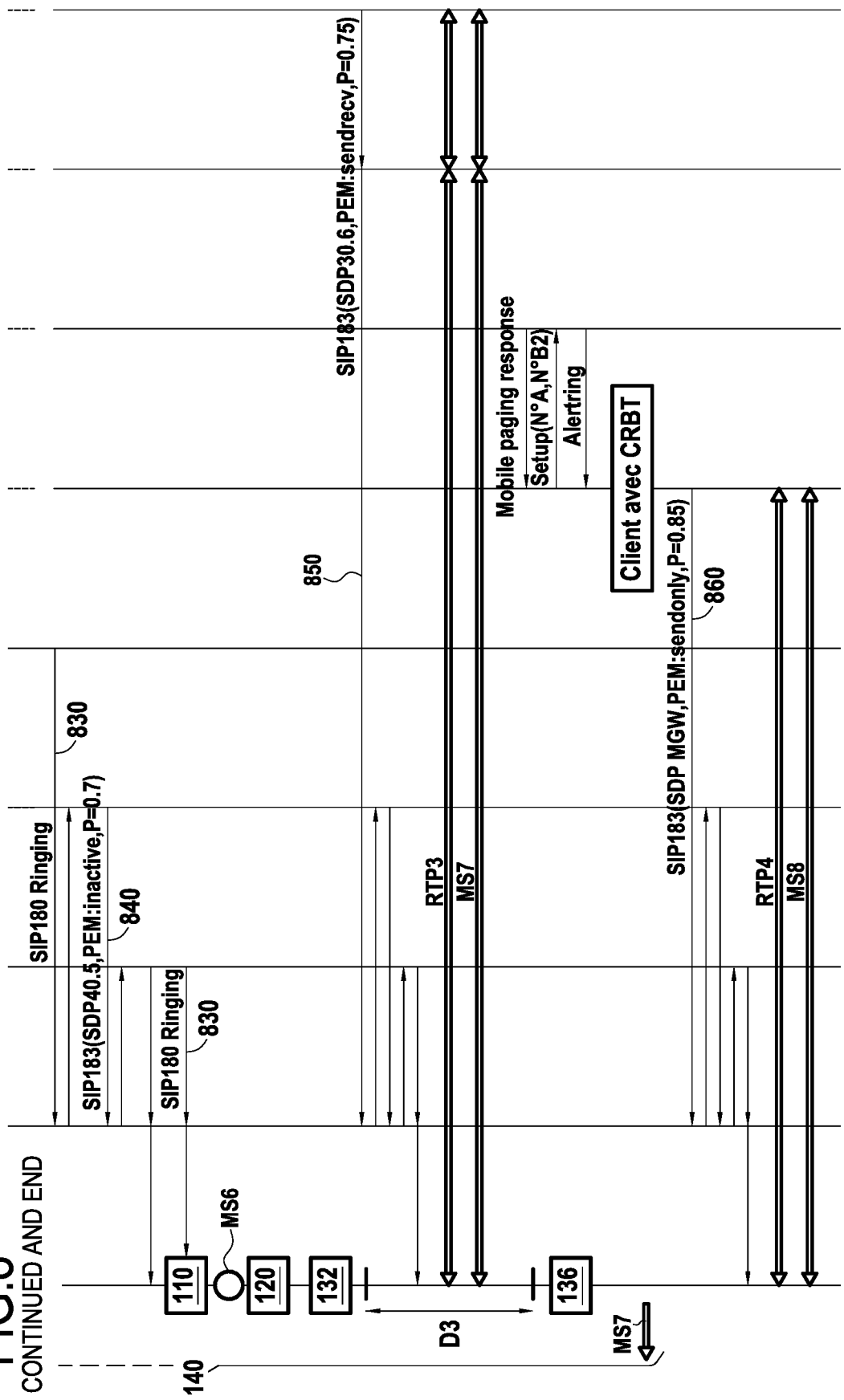

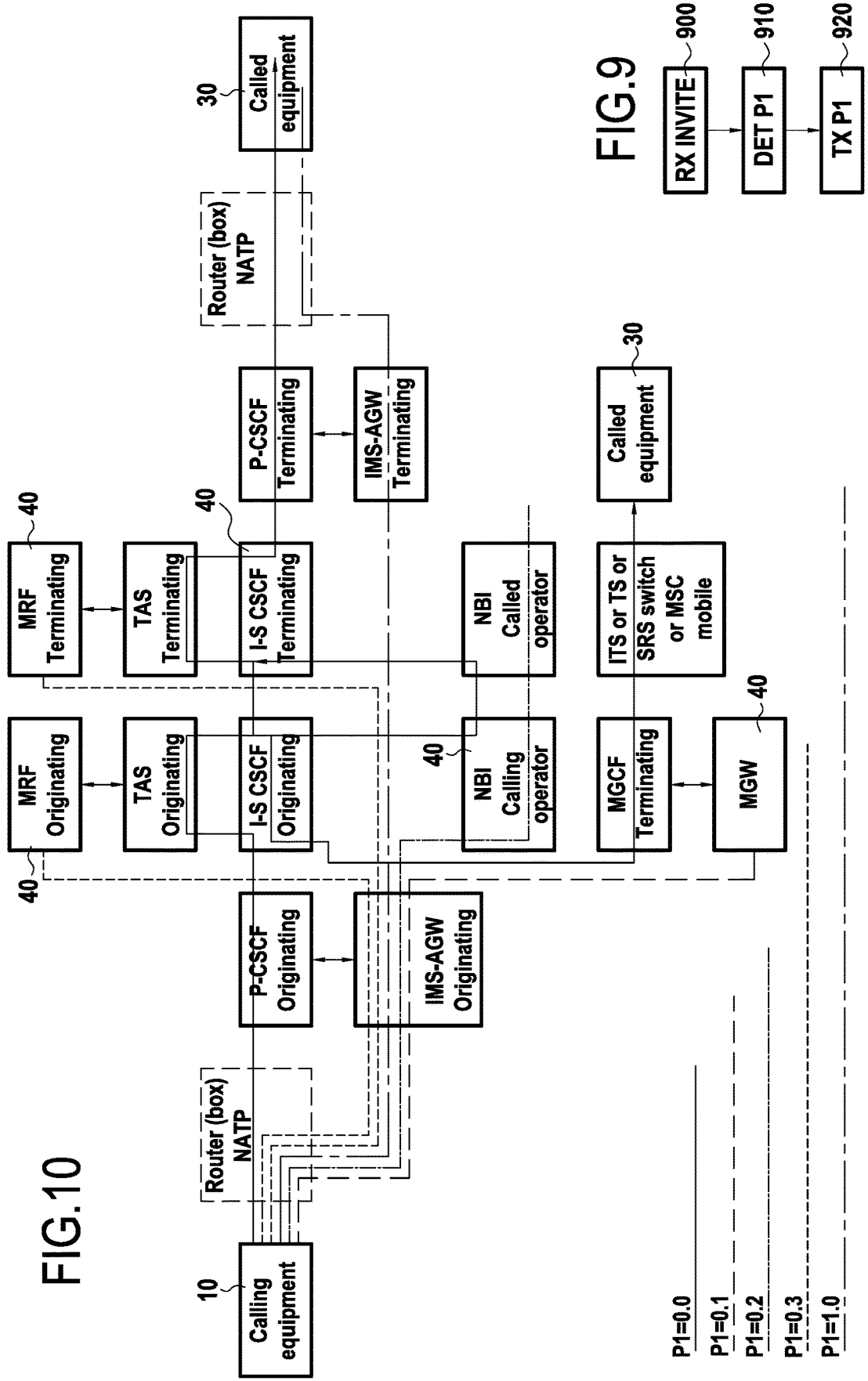

METHOD FOR MANAGING A PLURALITY OF MEDIA STREAMS, AND ASSOCIATED DEVICE

RELATED APPLICATIONS

This application is the U.S. National Phase of Application No. PCT/FR2019/050643 entitled "METHOD FOR MANAGING A PLURALITY OF MEDIA STREAMS, AND ASSOCIATED DEVICE" and filed Mar. 21, 2019, which claims the benefit of French Patent Application No. 1852766, filed Mar. 29, 2018, each of which is incorporated by reference in its entirety.

BACKGROUND OF THE INVENTION

The present invention lies in the field of telecommunications networks, such as IMS (IP Multimedia Subsystem), VoIP (voice over IP) or Circuit type networks.

The present invention more specifically relates to methods for managing media streams, intended to be rendered by a calling device before the finalization of the establishment (set up) of a communication between the calling device and a called device (also called early media streams).

Such a media stream can be generated by the calling device, the called device or even by intermediate network equipment.

In addition, such a media stream is generally an audio or video stream. The media stream can for example be a Ring Back Tone (RBT), a music stream, such as a "Colored Ringback Tone", or an announcement.

After sending a request to establish a communication, the calling device can receive a message indicating to the calling device to render a media stream. The calling device can receive the media stream and render it or recover the media stream in its memory and render it, without causing any difficulty.

However, in some situations, the calling device may receive several messages, each message indicating to the calling device to render a different media stream. Indeed, several media streams can be generated sequentially and/or concurrently before the finalization of the establishment of the communication.

This is for example the case when a mechanism for directing the same call toward several called devices is put in place (forking).

This SIP (Session Initiation Protocol) mechanism allows reaching, for a same call (and therefore for the emission of a same request to establish a communication), several recipients either simultaneously (all recipients are requested upon emission of the call) or sequentially (a first recipient is requested, then, depending on its response, the second recipient is requested, etc.).

Other services using such a mechanism are the call forwarding services in "simultaneous ringing" or "sequential ringing" mode, the services of connection via an interactive voice server (IVS) or a call center, as well as the "Multi terminal SIP"-type services.

The media stream broadcasting also increases due to regulations encouraging more and more often to better inform the consumers. The broadcast media streams are then voice announcements made before the actual billing of the calling party.

When the calling device receives several messages (typically when the "forking" is not hidden to the calling device), each message indicating to the calling device to render a different media stream, the calling device does not know how to correctly process this plurality of messages.

No solution has been provided by the IETF (Internet Engineering Task Force) standardization which nevertheless raised the problem of the processing of such a plurality of media streams (see for example the extract "Early Media and Ringing Tone Generation in the Session Initiation Protocol" of the RFC3960).

Thus, generally, the calling device chooses a media stream randomly and renders only this stream.

OBJECT AND SUMMARY OF THE INVENTION

The present invention relates to a method for managing a plurality of media streams intended to be rendered by a calling device before a finalization of an establishment of a communication, said method being implemented by said calling device and before the finalization of the establishment of said communication, said method comprising the following steps:
sending a request to establish the communication to at least one called device,
for each media stream of said plurality of media streams, searching for a first degree of priority associated with said media stream, in a message received in response to the request to establish the communication,
selecting a media stream in order to render said media stream, said media stream being selected among said plurality of media streams, as a function of second degrees of priority associated with said media streams of said plurality of media streams, said second degrees of priority being obtained according to the result of the search.

The selection of a media stream as a function of the second degrees of priority allows rendering the most relevant media stream, for example for each phase of the establishment of the communication. The experience of the user is thus improved.

In a particular embodiment, for each media stream of the plurality of media streams:
the second degree of priority obtained is the first degree of priority in case of presence of the first degree of priority in the received message,
the second degree of priority obtained is a default degree of priority in case of absence of the first degree of priority in the received message.

The solution of the invention thus takes into account the diversities of operation and configuration of the network equipments.

In a particular embodiment, the selection step comprises a comparison of the second degrees of priority associated with said media streams of said plurality of media streams, a media stream being selected according to the result of the comparison.

In a particular embodiment, the selection step comprises obtaining a second degree of priority associated with a first media stream of said plurality of media streams, following the receipt of a first message received in response to the request to establish the communication, said obtaining of said second degree of priority associated with said first media stream being followed by a step of rendering said first media stream, the selection step further comprising, during the step of rendering said first media stream, obtaining a second degree of priority associated with a second media stream of said plurality of media streams, following the receipt of a second message received in response to the request to establish the communication, the method comprising, if the second degree of priority of the second media stream is higher than the second degree of priority of the first media stream, a step of interrupting the rendering of the first media stream and a step of rendering the second media stream, in place of the first media stream.

In a particular embodiment, the receiving step comprises receiving a signaling message associated with a media stream of said plurality of media streams, the first degree of priority of said media stream then being sought in said signaling message.

In a particular embodiment, the search step comprises an identification of the media stream associated with said signaling message, by comparing the value of a data of said signaling message with the value of a data of said media stream associated with said signaling message.

In a particular embodiment, the receiving step comprises receiving a control packet associated with a media stream of said plurality of media streams, the first degree of priority then being sought in said control packet.

The solution of the invention thus takes into account the diversities of operation and configuration of the network pieces of equipment.

In a particular embodiment, the receiving step comprises:
receiving a third message received in response to the request to establish the communication,
recording, in a memory of the calling device, for a predetermined duration starting upon receipt of the third message, at least one stream of said plurality of media streams, said media stream being received by the calling device,
the selection step being implemented when the predetermined duration has elapsed.

The selection of the stream at the end of the predetermined duration allows managing the asynchronous arrival of several messages received by the calling device in response to the request. As a matter of fact, the calling device has no information on the number of messages it can receive in response to this request, and the latencies of the messages may differ.

In a particular embodiment, the third message is the first message.

In a particular embodiment, the predetermined duration depends on the value of the second degree of priority obtained according to the result of the search in said third message.

Thus, the delay between the sending of the request and the rendering of the first media stream information is limited, so as not to leave the user in the "void/blank", which allows improving the experience of the user of the calling device. Specifically, the more the equipment generating the media stream is close to the calling device, the less the network delays are important to receive the message, and the less the probability of receiving other messages related to other media streams is important.

In a particular embodiment, the method comprises a step of rendering the selected media stream, the rendering being accelerated so that the duration of the rendering step is reduced by the predetermined duration.

This accelerated rendering allows recovering a real-time aspect when the user of the called device accepts the call. Specifically, the accelerated rendering allows not truncating the information of the media stream (for example, in the case of a voice announcement, there is thus less risk of repeating this voice announcement), while optimizing the memory resources of the calling device.

In a particular embodiment, the search step comprises receiving at least one stream of said plurality of media streams comprising:
detecting a device called a translation device, implementing a translation of a network address of the calling device, and
for each media stream, sending a data traveling through said translation device, so as to create an entry at the translation device that allows receiving said media stream.

In a particular embodiment, the method comprises a step of detecting a type of call, the steps of searching for a first degree of priority and selecting a media stream being implemented if the type of the call is standard.

The invention further relates to a calling device able to implement a method for managing a plurality of media streams as described above.

The invention further relates to a method for managing at least one media stream intended to be rendered by a calling device as described above, the method comprising the following steps:
for each of the at least one stream, determining the associated first degree of priority,
for each first degree of priority determined, sending said first degree of priority in a message to the calling device.

In a particular embodiment, for each of the at least one stream, the first degree of priority is determined as a function of the network distance between the calling device and a network device associated with said stream.

The invention furthermore relates to a called device, an intermediate network equipment or a management system comprising a called device and/or an intermediate network equipment, configured to implement the method for managing at least one media stream such as described above.

In a particular embodiment, the different steps of the method according to the invention are determined by computer program instructions.

Consequently, the invention also relates to a computer program, on an information medium, this program including instructions adapted to the implementation of the steps of a method according to the invention.

This program can use any programming language, and be in the form of source code, object code or intermediate code between source code and object code, such as in a partially compiled form or in any other desirable shape.

The invention also relates to an information medium readable by a computer and including instructions of a computer program as mentioned above.

The information medium can be any entity or device capable of storing the program. For example, the medium may include a storage means, such as a ROM, for example a CD ROM or a microelectronic circuit ROM or a magnetic recording means, for example a hard disk.

On the other hand, the information medium can be a transmissible medium such as an electrical or optical signal, which can be conveyed via an electrical or optical cable, by radio or by other means. The program according to the invention can be particularly downloaded over an Internet-type network.

Alternatively, the information medium can be an integrated circuit in which the program is incorporated, the circuit being adapted to execute or to be used in the execution of the method in question.

BRIEF DESCRIPTION OF THE DRAWINGS

Other characteristics and advantages of the present invention will emerge from the description given below with reference to the appended drawings which illustrate an exemplary embodiment thereof without limitation. In the figures:

FIG. 9 represents, in the form of a flowchart, the main steps of a method for managing at least one media stream according to an exemplary embodiment of the invention;

FIG. 10 schematically represents examples of network distances between network equipments and a calling terminal.

DETAILED DESCRIPTION OF SEVERAL EMBODIMENTS

Figure 1:
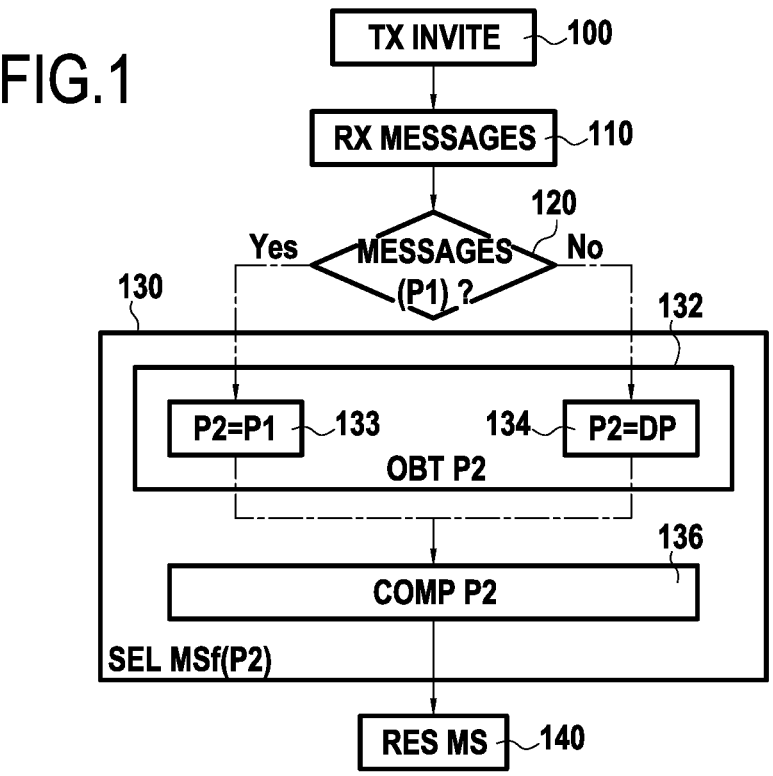
FIG. 1 represents, in the form of a flowchart, the main steps of a method for managing a plurality of media streams according to an exemplary embodiment of the invention.

FIG. 1 represents, in the form of a flowchart, the main steps of a method for managing a plurality of media streams intended to be rendered by a calling device before the finalization of the establishment of a communication, according to an exemplary embodiment of the invention.

As described above, a media stream intended to be rendered by a calling device before the finalization of the establishment of a communication is generally an audio or video stream. Such a media stream can for example be:
- a Ring Back Tone (RBT), typically sent by an equipment of the called network of the SRS (Self Routing Switch) type on a fixed network STN (Switched Telephone Network) and MSC (Mobile Switch Center) on a mobile network,
- a music stream, such as a Colored Ringback Tone,
- a waiting time announcement (typically when the called party is a call center),
- a regulatory announcement explaining the billing of a service (typically when the called party is a call center or an interactive voice server),
- an emergency number service announcement, such as a deterrent announcement,
- an announcement related to a telecommunications service (for example the call waiting service, informing the calling party that the called party is in a current communication and informed of the call),
- a line announcement interrupted when the called party has not paid their bills,
- the sequential/simultaneous multi-destination call forwarding service,
- the access to intelligent network services of the prepaid card type,
- an announcement of a callback service for the last calling party (the 3131 service at Orange® in France), etc.

Figure 2:
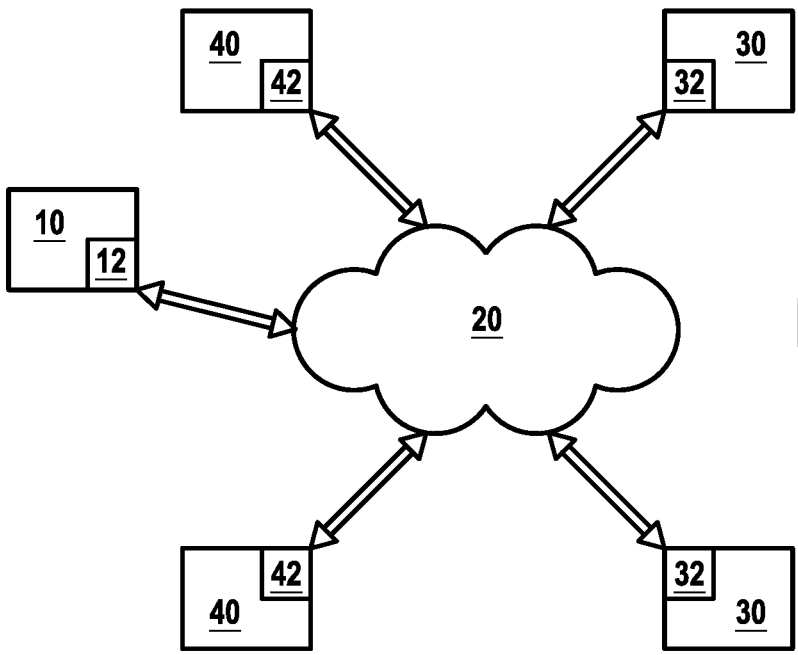
FIG. 2 schematically represents a system for managing a plurality of media streams according to an exemplary embodiment of the invention.

This method can be implemented by a calling device 10 according to the invention, represented, in its context, in FIG. 2.

The calling device 10 has the hardware architecture of a computer. It includes in particular a processor, a read-only memory, a random access memory and a non-volatile flash memory (not represented), as well as communication means 12 through which it is linked to a communication network 20, to which one or several called device(s) 30 and possibly one or several intermediate piece(s) of equipment 40 can also be linked.

The read-only memory of the calling device 10 constitutes a recording medium according to the invention, readable by the processor and on which a computer program according to the invention is recorded, including instructions for the execution of the steps of the method of FIG. 1. As a variant, the computer program is stored in the random access memory of the calling device 10.

The calling device 10 can be a terminal such as a fixed or mobile telephone, a computer, a Smartphone, a digital tablet, a connected TV, a vehicle, a connected object, etc.

Each called device 30 can be a terminal such as a fixed or mobile telephone, a computer, a Smartphone, a digital tablet, a vehicle, a connected object, etc., or a private branch exchange such as a PABX (Private Automatic Branch exchange) or IPBX (Internet Protocol Private Branch exchange).

In addition, each additional equipment 40 can be an MRF (Media Resource Function) server controlled by an application server, a switch of a fixed network, a mobile network switch, an intelligent network platform, a network interconnection server such as an I-SBC (Interconnect Session Border Controller), a Media Gateway, a network access box, etc.

In this example, the calling device 10 wishes to establish a communication with a called device 30. The calling device 10 then sends, in a step 100, an INVITE request to establish the communication (or to establish a SIP session), to the called device 30.

The calling device 10 can then receive, in response to the INVITE request, several messages, each message being associated with a stream different from the plurality of streams (step 110).

By "in response to the INVITE request", it is meant that the message is a direct or indirect response to the INVITE request, that the message is sent following the sending of the INVITE request.

The calling device 10 then searches, for each media stream of the plurality of streams, for a first degree of priority P1 associated with the media stream, in the received message associated with this stream (step 120).

The first degree of priority P1 is for example a real number that can be comprised between 0.0 and 1.0, so that the value 1.0 corresponds to the highest priority. The values of the first degrees of priority P1 can be normalized according to the importance of the media streams associated with these degrees of priority.

Then, in a step 130, the calling device 10 selects, among the plurality of media streams, a media stream MS with a view to rendering it. The selection of the media stream MS is performed as a function of second degrees of priority P2 associated with the media streams, these second degrees of priority P2 being obtained (sub-step 132) according to the result of the search implemented in step 120. Each second degree of priority P2 indeed indicates the relevance of the media stream with regard to the user of the calling device 10.

More specifically, for each media stream of the plurality of streams:

the second degree of priority P2 obtained can be the first degree of priority P1 in case of presence of the first degree of priority P1 in the received message (sub-step 133), the second degree of priority P2 obtained can be a default degree of priority DP in case of absence of a first degree of priority P1 in the received message (sub-step 134), the value of the default degree of priority DP being typically of 0.0 (corresponding to the lowest priority).

The selection step 130 can then comprise a comparison of the second degrees of priority P2 associated with said media streams of the plurality of media streams (sub-step 136), a media stream being selected according to the result of the comparison. For example, the selected media stream is the media stream associated with the second degree of priority with the highest value.

In a step 140, the calling device 10 can then render the media stream MS selected in step 130, so that the user of the calling device 10 can hear the rendering of the most relevant media stream, before the user of the called device 30 accepts to establish the communication.

As described in more detail below, the rendered media stream MS can be pre-recorded in the read-only or random access memory of the calling device 10, received by the calling device 10 and then stored at least partly in the random access memory of the calling device 10 before the rendering, or received by the calling device 10 in real time.

Further, as described below, each of the receiving 110, search 120, selection 130 and rendering 140 steps can be repeated one or several times.

The finalization of the establishment of a communication corresponds to the moment or a user of the called device 30 accepts the communication or when another user accepts the communication in case of call forwarding, or when a server accepts the communication for example the messaging service of the user of the called device 30, or even an application server.

In the receiving step 110, the receipt of two different messages can be sequential (the two messages are received at different times of the communication establishing phase, before the finalization of the establishment). The duration elapsed between the receipt of one of the two messages and the sequential receipt of the other message is typically on the order of ten seconds.

When the receipt is sequential, the selection step 130 can then comprise obtaining 132 a second degree of priority P2 associated with a first media stream, following the receipt of a first message received in response to the INVITE request to establish the communication, this obtaining 132 being followed by a rendering 140 of the first media stream.

As a matter of fact, at this stage, a single message associated with a media stream is received by the calling device 10. The comparison sub-step 136 cannot therefore be implemented.

The selection step 130 can then comprise, during the rendering 140 of the first media stream, obtaining 132 a second degree of priority P2 associated with a second media stream, following the receipt 110 of a second message received in response to the INVITE request to establish the communication.

The calling device 10 can then implement the comparison sub-step 136. If the second degree of priority P2 of the second media stream is greater than the second degree of priority P2 of the first media stream, the rendering of the first media stream is interrupted, and the second media stream is rendered, in place of the first media stream. If the second degree of priority P2 of the first media stream is greater than the second degree of priority P2 of the second stream, the rendering of the first stream continues, and the second media stream is not rendered.

The rendering of the first stream can be interrupted upon selection of the second media stream, or at the end of the first stream.

The end of the first stream can be indicated to the calling device 10 by means of a signaling message sent to the calling device 10, typically a signaling message comprising a P-Early-Media (PEM) header having an attribute parameter a=inactive.

The calling device can also detect the end of the first stream when it stops receiving the first stream, typically for a predetermined duration, or upon receipt of an RTCP BYE packet emitted by the called device 30 associated with the first stream.

The comparison sub-step 136 can be repeated if, during the rendering of the first media stream or of the second media stream, a third message associated with a third media stream is received by the calling device 10.

Figure 3:
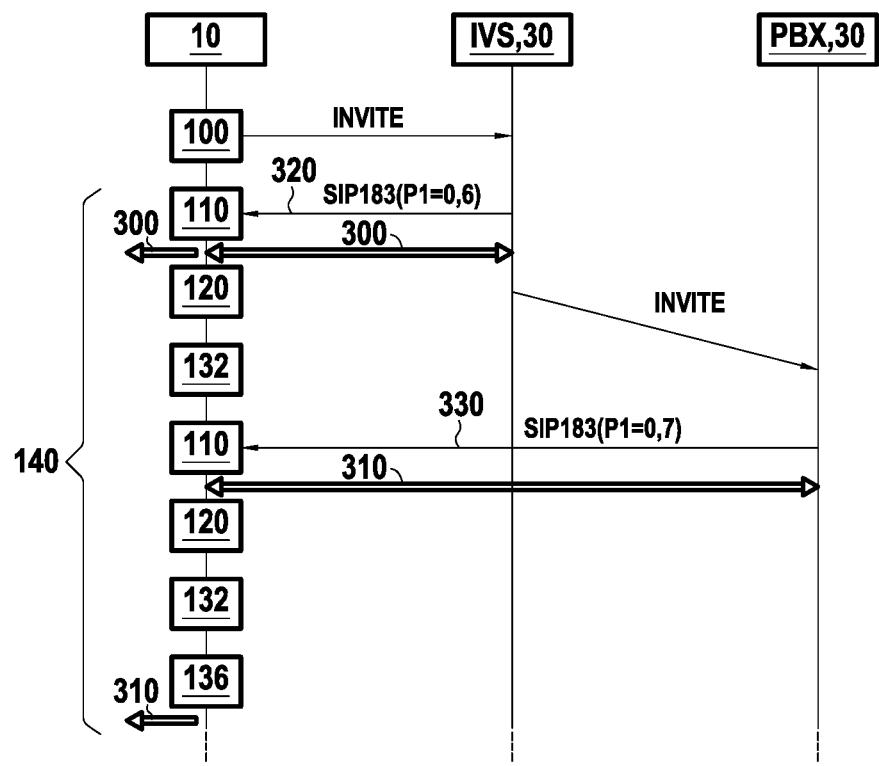
FIGS. 3 to 8 represent, in the form of flowcharts, steps of methods for managing a plurality of media streams according to exemplary embodiments of the invention.

FIG. 3 illustrates an example comprising a sequential receipt of two different messages, typically implemented when the user of the calling device 10 is trying to contact a service associated with a chargeable number. In such a situation, the user of the calling device 10 should first listen to the rendering of a first media stream 300 associated with an interactive voice server IVS (first called device 30), which comprises an announcement indicating that the call is chargeable, then listen to the rendering of a second media stream 310 associated with a private branch exchange PBX (second called device 30), comprising for example a description of the service that the user is trying to contact and/or a waiting message.

The INVITE request sent by the calling device 10 is first received by the interactive voice server IVS, which sends a first message 320 to the calling device 10, as well as the first media stream 300. The calling device 10 then renders the first media stream 300 because it has at this stage only the first media stream 300 to render.

The calling device 10 can furthermore search for a first degree of priority P1 associated with the first media stream 300 in the first message 320. It is assumed in this example that the calling device 10 finds in the first message 320 a first degree of priority P1 associated with the first media stream 300, the value of this first degree of priority P1 being 0.6. The value of the second degree of priority P2 is then equal to 0.6.

Concurrently, the interactive voice server IVS transmits the INVITE request to the private branch exchange PBX. The private branch exchange PBX then sends to the calling device 10 a second message 330 as well as the second media stream 310.

The calling device 10 can then search for a first degree of priority P1 associated with the second media stream 310 in the second message 330. It is assumed in this example that the calling device 10 finds in the second message 330 a first degree of priority P1 associated with the second media stream 310, the value of this first degree of priority P1 being 0.7. The value of the second degree of priority P2 is then equal to 0.7.

The calling device 10 then compares the value of the second degree of priority P2 of the first media stream 300 and the value of the second degree of priority P2 of the second media stream 310. The value of the second degree of priority P2 of the second media stream 310 being greater than the value of the second degree of priority P2 of the first media stream 300, the calling device 10 selects the second media stream 310. The rendering of the first media stream 300 is then interrupted and the second media stream 310 is rendered in place of the first media stream 300.

Thus, the calling device 10 can render several media streams sequentially, each rendered stream being associated with different phases of the communication establishing procedure (for example a media stream associated with the network of the calling device, then an associated media stream associated with the called device, typically a PBX or an IVS).

The receipt of two different messages can also be simultaneous or almost simultaneous (the two messages are received at the same time or almost at the same time of the communication establishing procedure, before the finalization of the establishment). The duration elapsed between the receipt of one of the two messages and the almost simultaneous receipt of the other message is typically on the order of one second, this duration thus being much shorter than the typical duration of a sequential receipt.

The sub-step 136 of comparing the second degrees of priority P2 associated with the media streams associated with the messages received simultaneously or almost simultaneously, as well as possibly the second degree of priority P2 associated with a media stream being rendered by the calling device 10, can be implemented before a possible rendering of one of the media streams associated with the messages received simultaneously or almost simultaneously.

A sequential receipt of a message can follow a simultaneous or almost simultaneous receipt of at least two messages. The selection step is then implemented a first time for the media streams associated with the messages received simultaneously or almost simultaneously, as a function of the second degrees of priority associated with these media streams, then the selected media stream can be rendered. The selection step is then implemented a second time for the media stream(s) associated with the message(s) received afterwards (sequential receipt), and the media stream previously selected.

Figure 4:
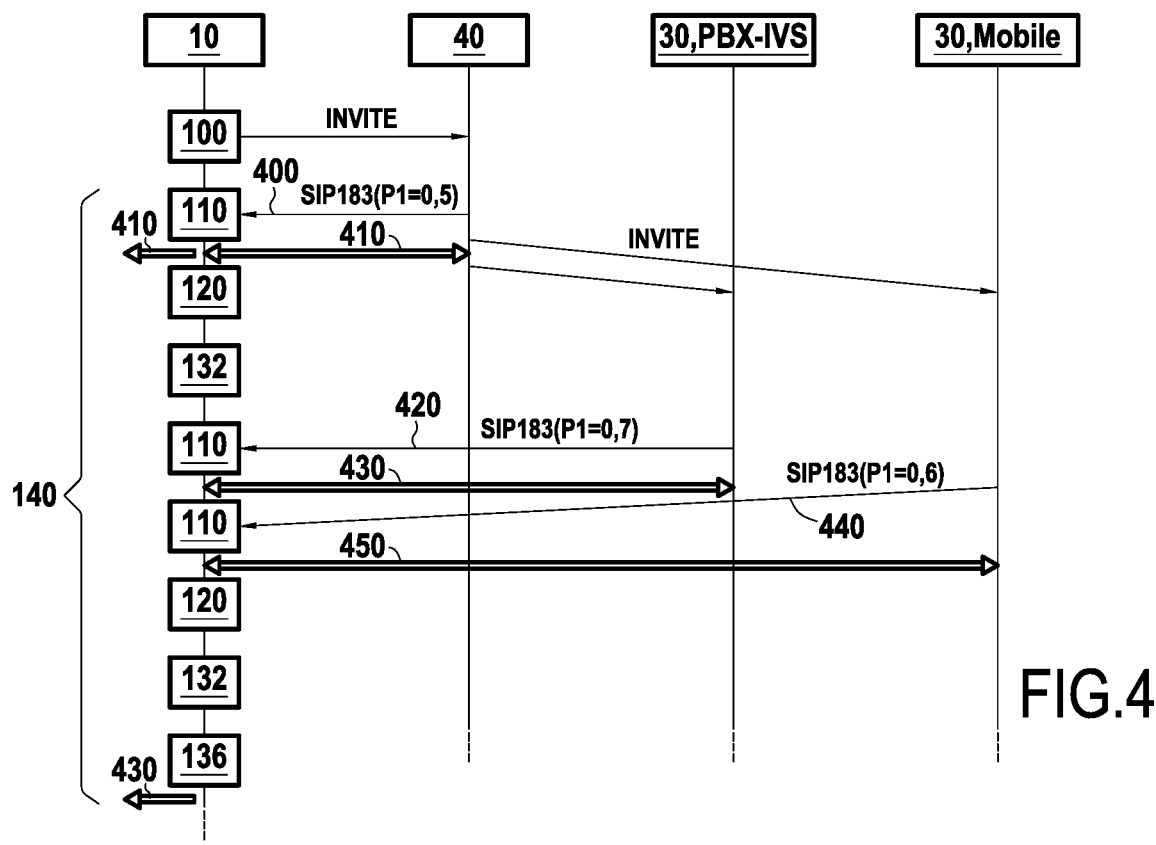

FIG. 4 illustrates an example comprising a receipt of a first message 400 associated with a first media stream 410, followed by an almost simultaneous receipt of a second message 420 associated with a second media stream 430 and of a third message 440 associated with a third media stream 450. In this example, the user of the calling device typically tries to contact another user benefiting from a service allowing the simultaneous ringing of two called devices, the first called device 30 being for example a private branch exchange PBX or an interactive voice server IVS of a company of the other user, and the second called device 30 being for example the mobile telephone of the other user.

In such a situation, the user of the calling device 10 should first listen to the rendering of the first media stream, which is associated with a server 40 of the service and which comprises an announcement indicating typically that a correspondent is sought, then listen to the rendering of the second media stream, which is associated with the private branch exchange PBX and which comprises for example a description of the company and/or a waiting message.

The INVITE request, sent by the calling device 10, is first received by the server 40 of the service, which sends the first message 400 to the calling device 10, as well as the first media stream 410. The calling device 10 then renders the first media stream 410, because it has at this stage only the first media stream 410 to render.

The calling device 10 can furthermore search for a first degree of priority P1 associated with the first media stream 410 in the first message 400. It is assumed in this example that the calling device 10 finds in the first message 400 a first degree of priority P1 associated with the first media stream 410, the value of this first degree of priority P1 being of 0.5. The value of the second degree of priority P2 associated with the first media stream 410 is then equal to 0.5.

Concurrently, the server 40 of the service transmits the INVITE request to the private branch exchange PBX and to the mobile telephone. The private branch exchange PBX then sends to the calling device 10 the second message 420 as well as the second media stream 430. In addition, the mobile telephone 30 sends to the calling device 10 the third message 440 as well as the third media stream 450.

The calling device 10 can then search for a first degree of priority P1 associated with the second media stream 430 in the second message 420, as well as a first degree of priority P1 associated with the third media stream 450 in the third message 440. It is assumed in this example that the calling device 10 finds in the second message 420 a first degree of priority P1 associated with the second media stream 430, the value of this first degree of priority P1 being of 0.7, and that the calling device 10 finds in the third message 440 a first degree of priority P1 associated with the third media stream 450, the value of this first degree of priority P1 being of 0.6. The value of the second degree of priority P2 associated with the second media stream 430 is then equal to 0.7 and the value of the second degree of priority P2 associated with the third stream 450 is of 0.6.

The calling device 10 then compares the value of the second degree of priority P2 of the first media stream 410, the value of the second degree of priority of the second media stream 430 and the value of the second degree of priority P2 of the third media stream 450. The value of the second degree of priority P2 of the second media stream 430 being greater than the value of the second degree of priority P2 of the first media stream 410 and than the value of the second degree of priority P2 of the third media stream 450, the calling device 10 selects the second media stream 430. The rendering of the first media stream 410 is then interrupted and the second media stream 430 is rendered in place of the first media stream 410. The third media stream 450 is not rendered.

Returning to FIG. 1, each message received in the receiving step 110 may be a signaling message or a control packet.

In case where the received message is a signaling message, the message can be a message indicating the presence of a media stream, for example of the "SIP 183 In Progress" or "SIP 180 Ringing" type. The first degree of priority P1 of the associated media stream is thus sought in the signaling message. More specifically, the message can comprise a P-Early-Media (PEM) header comprising the first degree of priority P1. The header can for example take the following form: PEM:a=sendrecv; gate; P1=0.85.

The received message can be associated with a media stream sent to the calling device 10 or with a media stream pre-recorded in the read-only or random access memory of the calling device 10, typically the media stream RBT.

The message "SIP 180 Ringing" indicates for example to the calling device 10 to render the prerecorded media stream, while the message "SIP 183 In Progress" indicates to the calling device to render a media stream sent to the calling device 10.

Figure 5:
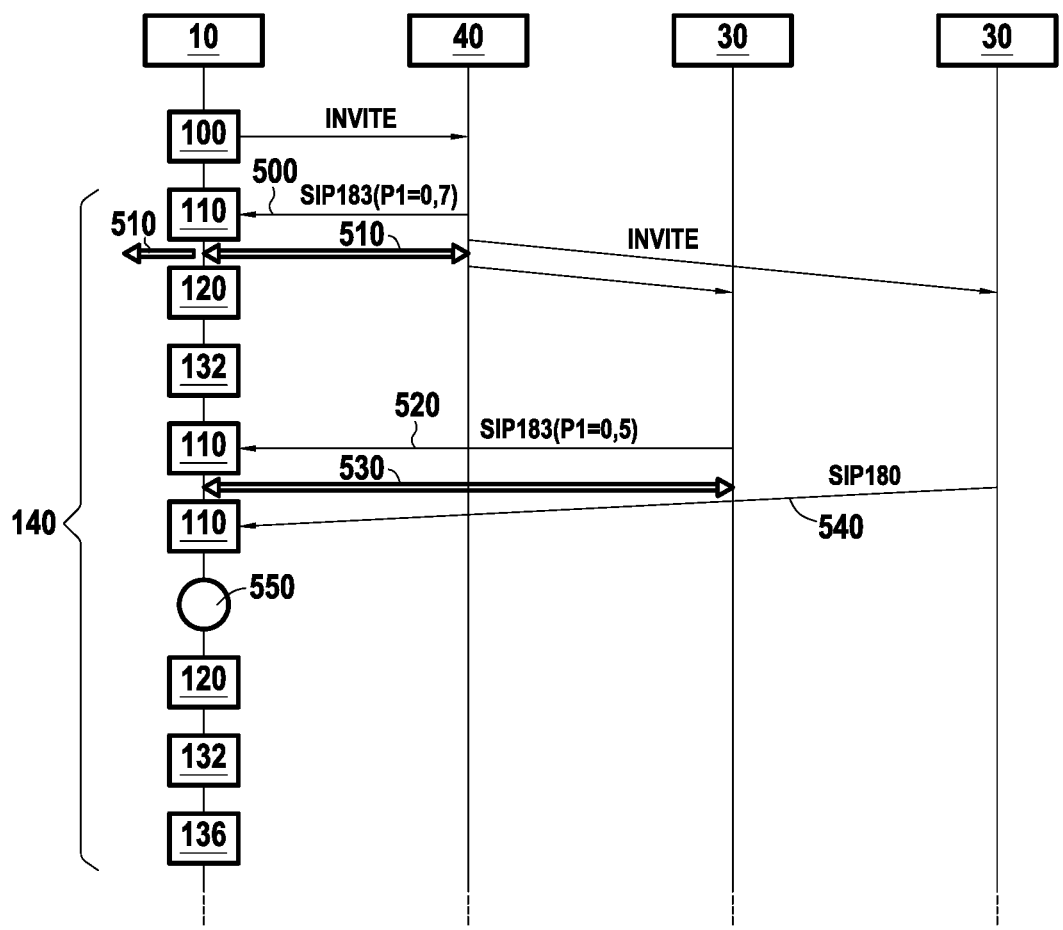

FIG. 5 illustrates an example comprising a receipt of a first "SIP 183 In Progress"-type message 500 associated with a first media stream 510, followed by an almost simultaneous receipt of a second "SIP 183 In Progress"-type message 520 associated with a second media stream 530 and of a third "SIP 180 Ringing"-type message 540 associated with a third media stream 550.

In this example, the user of the calling device typically tries to contact another user benefiting from a service allowing simultaneous ringing of two called devices, the first called device 30 further benefiting from a service allowing the user to choose a personalized media stream CRBT (Color Ring Back Tone), while the second called device 30 does not benefit from such a service.

In such a situation, the user of the calling device 10 should first listen to the rendering of the first media stream, which is associated with a server 40 of the service allowing simultaneous ringing of two called devices, then listen to the rendering of the second media stream, which is associated with the first called device 30.

The INVITE request, sent by the calling device 10, is first received by the server 40 of the service, which sends the first message 500 to the calling device 10, as well as the first media stream 510. The calling device 10 then renders the first media stream 510, because it has at this stage only the first media stream 510 to render.

The calling device 10 can furthermore search for a first degree of priority P1 associated with the first media stream 510 in the first message 500. It is assumed in this example that the calling device 10 finds in the first message 500 a first degree of priority P1 associated with the first media stream 510, the value of this first degree of priority P1 being of 0.7. The value of the second degree of priority P2 associated with the first media stream 510 is then equal to 0.7.

Concurrently, the server 40 of the service transmits the INVITE request to the first and second called devices 30. The first called device 30 then sends to the calling device 10 the second message 520 as well as the second media stream 530. In addition, the second called device 30 sends to the calling device 10 the third message 540 indicating to the calling device 10 to render the third media stream 550, which is pre-recorded in the read-only or random access memory of the calling device 10.

The calling device 10 can then search for a first degree of priority P1 associated with the second media stream 530 in the second message 520, as well as a first degree of priority P1 associated with the third media stream 550 in the third message 540.

It is assumed in this example that the calling device 10 finds in the second message 520 a first degree of priority P1 associated with the second media stream 530, the value of this first degree of priority P1 being of 0.5, and that the calling device 10 does not find in the third message 540 a first degree of priority P1 associated with the third media stream 550. The value of the second degree of priority P2 associated with the second media stream 530 is then equal to 0.5, and the value of the second degree of priority P2 associated with the third stream 550 is of 0.0.

The calling device 10 then compares the value of the second degree of priority P2 of the first media stream 510, the value of the second degree of priority of the second media stream 530 and the value of the second degree of priority P2 of the third media stream 550. The value of the second degree of priority P2 of the first media stream 510 being greater than the value of the second degree of priority P2 of the second media stream 530 and than the value of the second degree of priority P2 of the third media stream 550, the calling device 10 selects the first media stream 510. The rendering of the first media stream 510 is then not interrupted and the second and third media streams 530, 550 are not rendered.

Returning to FIG. 1, the search step 120 can comprise, for each "SIP 183 In Progress"-type signaling message received, an identification of the media stream associated with the received signaling message, by comparing the value of a data of the signaling message with the value of a data of the media stream associated with the signaling message.

More specifically, the value of a data of the signaling message can be compared with the value of a corresponding data of each media stream, until the corresponding media stream is identified. The corresponding media stream is identified when the value of the data of the signaling message corresponds to the value of the corresponding data of the media stream.

The compared data can be an IP address and a port number present in the signaling message, associated with the emitter of the media stream, with an IP address and a port number of the media stream, associated with the emitter of the media stream.

More specifically, in the case where the signaling message is an SDP response or SDP offer, it is the source IP address and the source UDP port number of the first early media RTP packet received from the media stream that is compared with the SDP content received in the signaling message (the IP address of the field "c" for "connection information" and the UDP port number in the field "m" for "media", declaring the codecs—see document RFC 4566).

The signaling message can be an SDP offer when the INVITE request does not comprise an SDP offer. The calling device 10 then sends a SIP PRACK message comprising an SDP response typically comprising the choice of the codec and screening, so as to correctly dimension the RTP storage queue of the media stream.

As a variant, the data compared can be SSRC (Synchronization SouRCe) identifiers. This 32-bit identifier, present in the media stream, can indeed be added to the signaling message associated with the media stream.

In this second case, the P-Early-Media header of the signaling message comprises the SSRC identifier present in the header of the RTP packets identifying the RTP stream.

The header can then for example take the following form: PEM:a=sendrecv; gate; p=0.85; SSRC=123456789.

This variant allows identifying the media stream associated with the signaling message received even when the IP address and the port number present in the signaling message, initially associated with the emitter of the media stream, are replaced by the IP address and the port number of an intermediate network equipment (that is to say a network equipment between the emitter of the signaling message and the calling device), typically an A-SBC (Access Session Border Controler) server implementing a function called media stream "typology Hiding" and/or "merge" function using the same source IP address and source port number to transmit the different media streams, each media stream being identified by the SSRC field.

Figure 6:
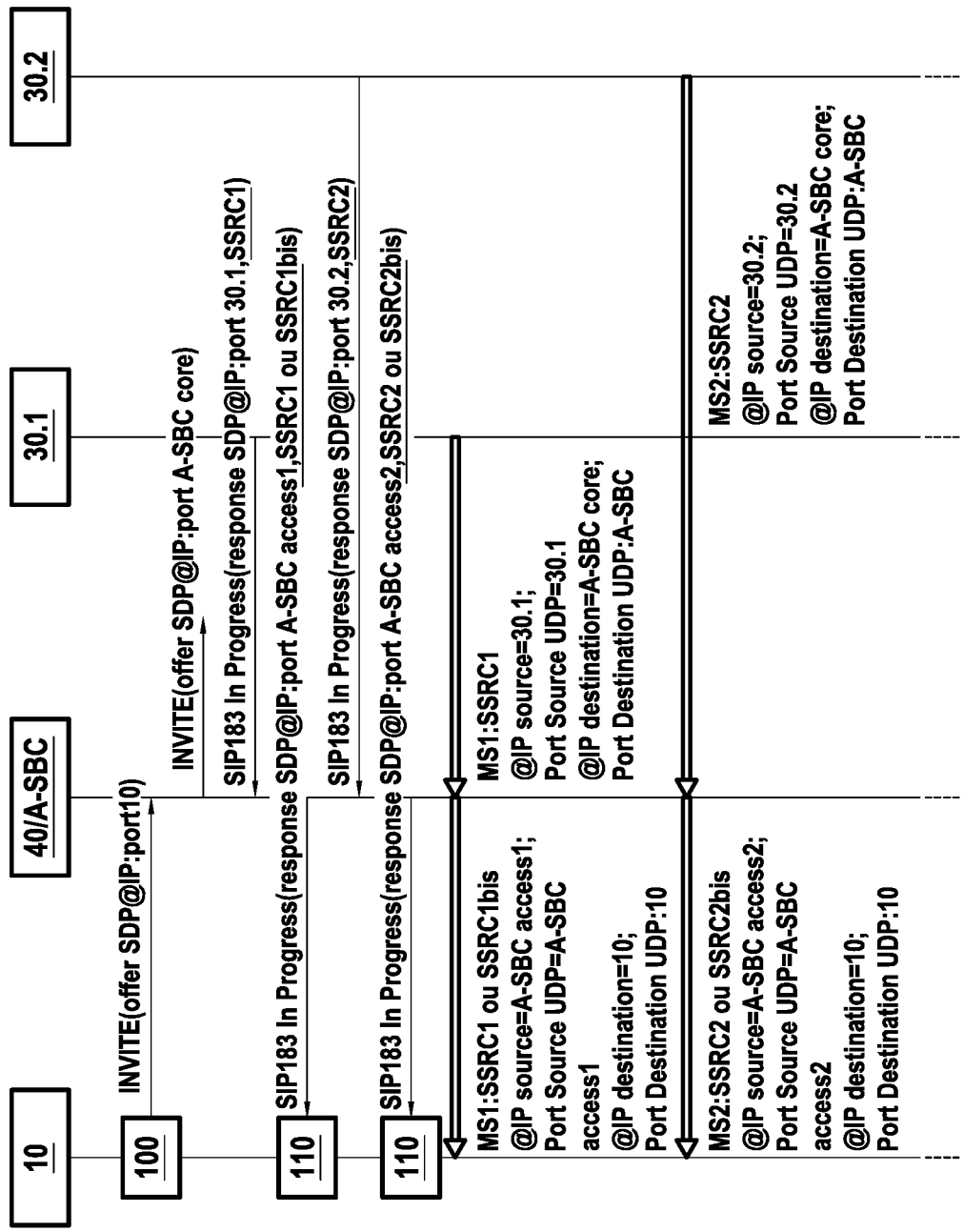

FIG. 6 illustrates an example in which SSRC identifiers are used by the calling device 10 in order to identify streams associated with received messages.

The INVITE request sent by the calling device 10 is received by an A-SBC server, which transmits the INVITE request to two called devices 30.1 and 30.2. Each called device 30.1 and 30.2 will then send a "SIP 183 In Progress"-type signaling message comprising the IP address and a port number of the called device 30.1, 30.2, as well as an SSRC identifier.

The A-SBC server receives each signaling message and, for each message, replaces the IP address and the port number of the called device 30.1 and 30.2 by the IP address and a port number of the A-SBC server.

The A-SBC server then sends each message thus modified to the calling device 10. Each called device 30.1 and 30.2 also sends a media stream MS1, MS2, each stream comprising an SSRC identifier, the IP address and a port number of the called device 30.1 and 30.2.

Each media stream MS1, MS2 is received by the A-SBC server, which replaces the IP address and a port number of the called device with the IP address and a port number of the A-SBC server. The A-SBC server then sends each stream MS1, MS2 thus modified to the calling device 10. The calling device 10 can then recover the signaling message corresponding to each received media stream MS1, MS2 by comparing the SSRC identifiers of the signaling messages and of the media streams MS1, MS2.

The SSRC identifier associated with a media stream is indeed always distinct from the SSRC identifier associated with another media stream (whereas the A-SBC server can use the same IP address and the same port to transmit the two media streams).

As a variant, the A-SBC server can modify the SSRC identifiers of the signaling messages received before sending the messages thus modified to the calling device 10. In this case, the A-SBC server modifies in the same way the SSRC identifiers of the media streams MS1, MS2 received before sending these streams MS1, MS2 thus modified to the calling device 10, so that the calling device 10 can recover the signaling message corresponding to each media stream MS1, MS2 received by comparing the SSRC identifiers of the signaling messages and of the media streams MS1, MS2.

When the message received is a control packet, the first degree of priority P1 is sought in said control packet. The control packet can comprise the SSRC identifier that allows associating the control packet with the corresponding media stream. The control packet is for example an RTCP (Real Time Control Protocol) packet of the APP (APPlication) type.

When a translation device 40, implementing a network address translation of the calling device 10 (for example implementing a NAPT function or Network Address Port Translation function) is positioned in the network 20 between the calling device 10 and a called device 30, it is necessary, for each media stream sent to the calling device 10, to create an entry at the translation device 40 allowing to receive said media stream. As a matter of fact, if the entry is not created at the translation device 40, the translation device 40 cannot receive the stream and transfer it to the calling device 10. The translation device 40 is for example a CGN (Carrier-grade NAT) equipment or a network termination equipment (a "Box"), this equipment and the calling device 10 being connected via a Local Area Network (LAN). The communication network 20 then comprises the local network and an extended network, the translation device ensuring the link between the local network and the extended network.

The search step can then comprise a sub-step of receiving at least one stream from the plurality of media streams comprising:

a detection of the translation device 40, and for each media stream, a sending of a data traveling through said translation device 40, so as to create an entry at the translation device 40 allowing to receive said media stream.

The calling device 10 can detect the translation device after receipt of a signaling message, for example by analyzing the content of a "Via" SIP field of the signaling message in order to detect therein a "received" SIP parameter, typically the parameter received=@IP WAN (Wide Area Network) of the translation device 40.

The calling device 10 then sends, immediately after each receipt of a "SIP 183 In Progress"-type signaling message (thus indicating that a media stream is sent to the calling device 10), a data in the form of a RTP packet toward the IP address and the UDP port number present in the signaling message at the SDP protocol, so as to create an entry called NAT (Network Address Translation) entry able to receive the stream, at the translation device level 40.

The sending of the RTP packet does not take into account neither the value of the parameter a=sendrecv/sendonly/ . . . of the received signaling message nor the possibly present priority parameter P1 and/or the possible presence of media stream SSRC identifier.

Figure 7:
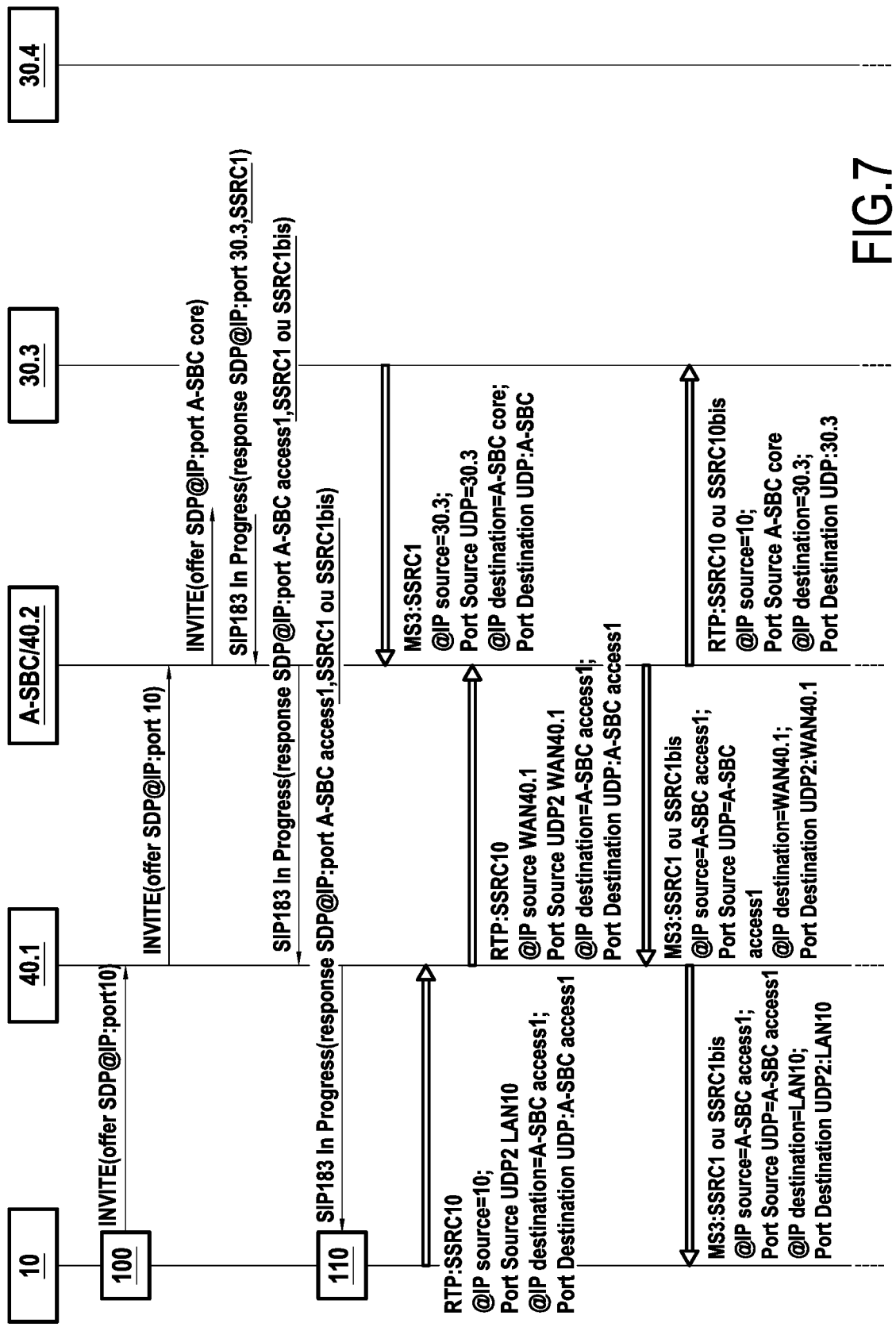

FIG. 7 illustrates an example in which the calling terminal 10 is connected via a local network to a network termination equipment 40.1, this network termination equipment 40.1 being connected to a wide area network further comprising an A-SBC server 40.2, a first called device 30.3 and a second called device 30.4.

The calling device 10 sends an INVITE request transported by an IP packet comprising a field @IP:port source1 LAN 10, this request being received by the network termination equipment 40.1 (i.e. the translation device). The network termination equipment 40.1 then replaces the value of the field @IP:port source1 LAN 10 by @IP:port source1 WAN 40.1, and transmits the request thus modified to the A-SBC server 40.2.

Upon receipt of the request, the A-SBC server 40.2 detects that the value of this field is different from the IP address contained in the body of the request (SDP) and thus detects the presence of the network termination equipment 40.1. The A-SBC server 40.2 then inserts in the "Via" SIP field the parameter "received @IP:port source1 WAN 40.1" in order to correctly route the SIP responses, and replaces, in the body of the request (SDP), the IP address and the port number of the calling device 10 by the IP address and a port number of the A-SBC server (corresponding to a network interface on the called equipment side). The A-SBC server then sends the request thus modified to the first and second called devices 30.3, 30.4.

When the first called device 30.3 receives the INVITE request modified by the network termination equipment 40.1 and the A-SBC server 40.2, the first called device 30.3 sends a "SIP 183 In Progress"-type signaling message comprising the IP address and a port number of the called device 30.3, as well as an identifier SSRC1.

The A-SBC server 40.2 receives the signaling message, then replaces the IP address and the port number of the called device 30.3 with the IP address and a port number of the A-SBC server 40.2 (corresponding to a network interface on the network termination equipment 40.1 side). The A-SBC server then sends the modified signaling message to the network termination equipment 40.1.

The network termination device 40.1 then replaces the value WAN 40.1 field @IP:port destination1 of the IP packet by @IP:port destination1 LAN 10, and sends the modified signaling message to the calling device 10.

The first called device 30.3 furthermore sends a media stream MS3 comprising an SSRC identifier, the IP address and a port number of the first called device 30.3. The media stream MS3 is received by the A-SBC server 40.2 and remains blocked at the A-SBC server 40.2 because the A-SBC server 40.2 does not yet know to which port of the network termination equipment 40.1 the media stream MS3 must be sent since the NAPT entry of the media stream is not created there yet.

Upon receipt of the modified signaling message, the calling device 10 sends an RTP packet toward the IP address and the UDP port number of the A-SBC server 40.2, so as to create a NAPT entry able to receive the MS3 stream at the network termination equipment 40.1.

The RTP packet further comprises the IP address and the port number of the calling device 10, that the network termination equipment 40.1 replaces with the IP address and a port number of the network termination equipment 40.1 before sending the modified packet to the A-SBC server 40.2.

The receipt of the RTP packet by the A-SBC server 40.2 triggers the sending of the media stream MS3 toward the created NAPT entry. The network termination equipment 40.1 then transmits the media stream MS3 to the calling device 10.

Concurrently, the A-SBC server 40.2 transmits the RTP packet to the first called device 30.3.

Likewise, when the second called device 30.4 receives the INVITE request modified by the network termination equipment 40.1 and the A-SBC server 40.2, the second called device 30.4 sends a "SIP 183 In Progress"-type signaling message comprising the IP address and a port number of the second called device 30.4, as well as an SSRC2 identifier. The steps described above are then implemented to transmit the signaling message and the media stream of the second called device 30.4.

Returning to FIG. 1, the receiving step may comprise a receipt of a message, called third message, received in response to the request to establish the communication, triggering a recording sub-step, in a memory of the calling device 10, of each media stream received by the calling device 10.

The third message is for example the message received first by the calling device 10, in response to the request to establish the communication, or the message received first by the calling device 10 following an implementation of the rendering step 140.

The recording sub-step is implemented for a predetermined duration starting upon receipt of the third message. Each media stream received is for example stored in distinct queues, in the random access memory of the calling device 10. The maximum value of the predetermined duration may for example be 1 second.

The value of the predetermined duration may depend on the value of the second degree of priority P2 obtained according to the result of the search in said third message. Typically, the greater the value of the second degree of priority P2, the smaller the value of the predetermined duration. This value can for example be calculated with the following formula: $D=1.0-P2$, where D is the duration and P2 the second degree of priority. The recording is then carried out only when the value of the second degree of priority is smaller than 1.0.

As a variant, the value of the predetermined duration can be fixed or based on any type of mathematical equation.

The selection step 130 is implemented when the predetermined duration has elapsed. The selection of the stream MS at the end of the predetermined duration allows managing the asynchronous arrival of several messages received by the calling device 10 in response to the INVITE request. As a matter of fact, the calling device 10 has no information on the number of messages it can receive in response to this request, and the latencies of the messages may differ.

In addition, making the value of the predetermined duration depend on the value of the second degree of priority P2 allows improving the experience of the user of the calling device by limiting the delay between the sending of the INVITE request and the rendering of the first media stream information, so as not to leave the user in the "void/blank".

Specifically, the closer the equipment 30, 40 generating the media stream is to the calling device 10, the less the network delays are important for receiving the message, and the less the probability of receiving other messages related to other media streams is important.

The selected media stream MS can then be rendered from the random access memory of the calling device 10, which does not allow truncating the information contained in this media stream.

The calling device 10 can concurrently continue to record the selected media stream MS. In addition, the calling device 10 can cease recording the other media streams and the parts of the other recorded media streams can be deleted from the random access memory of the calling device 10.

The rendering of the media stream can be accelerated, so that the duration of the rendering is reduced by the predetermined duration.

The stored media stream packets are thus rendered in an accelerated manner, to make up for the elapsed duration.

This accelerated rendering allows recovering a real time aspect when the user of the called device 30 accepts the call. Specifically, the accelerated rendering allows not truncating the information of the media stream (for example, in the case of a voice announcement, there is thus less risk of repeating this voice announcement), while optimizing the memory resources of the calling device 10.

The method can comprise a step (not represented) of detecting a call type (or detection of a SIP session type), the steps of searching 120 for a first degree of priority P1 and of selecting 130 a media stream MS being implemented if the call type is standard.

The call is standard when the number dialed is different from an emergency number. The calling device 10 detects the call type by means of the number dialed or by means of network information indicating that the call is an emergency call.

When the call is an emergency call, the calling device 10 should receive only one media stream, because the all services are disabled for this type of call, so as to avoid the service interactions and ensure that the call is routed as quickly as possible. The calling device 10 then immediately renders the received media stream (which may for example comprise a deterrent announcement).

Figure 8:
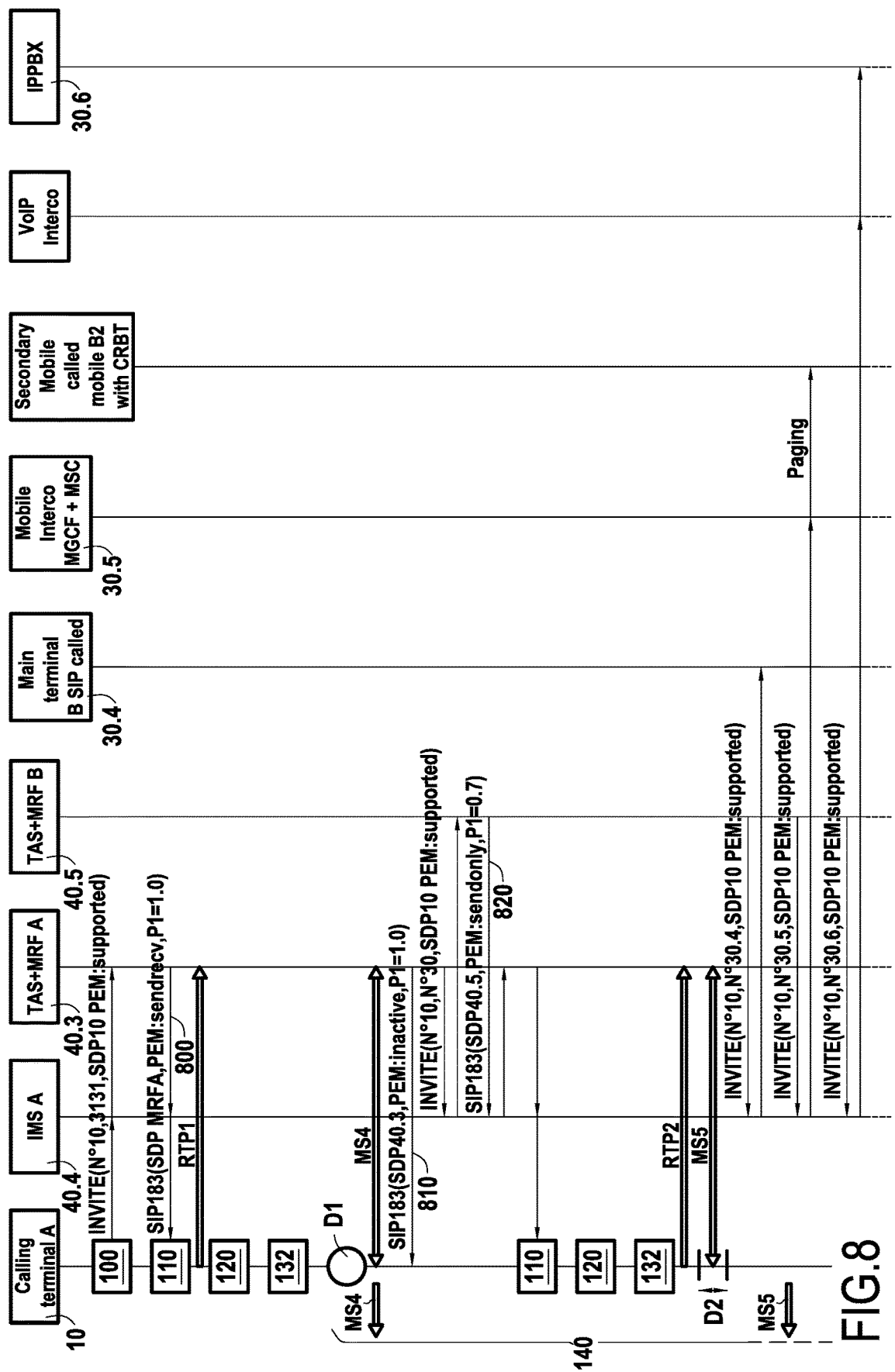

FIG. 8 illustrates an exemplary implementation of the method of the invention, in which the user of the calling device 10 first contacts a callback service for the last calling party.

In this example, the calling device 10 detects that the call is a standard call. The INVITE request sent by the calling device 10 is received by a server 40.3 linked to a service concerning the calling device 10 (called "originating operator service"), managing the callback service for the last calling party (typically a "TAS" server for "Telephony Application Server"), which sends in response a first "SIP 183 In Progress"-type message 800, the first message 800 comprising a first degree of priority P1 of value 1.0 associated with a first media stream MS4.

The calling device 10 analyzes the "Via" SIP field of the first message 800 and detects a "received" SIP parameter in this field. The calling device 10 then sends at least one RTP1 packet toward the server 40.3 managing the callback service for the last calling party, in order to create a NAPT entry at a translation device 40.4 (typically a network core device IMS of the network of the calling party) positioned in the network between the calling device 10 and the server 40.3, in order to receive the first stream MS4.

The receipt of the first message 800 triggers the calculation of a first stream recording duration D1. The second degree of priority P2 obtained being equal to the first degree P1 of the first message 800 and therefore equal to 1.0, the first duration D1 is of 0 seconds and the recording is not implemented.

The calling device 10 then selects the first media stream MS4, which is sent by the server 40.3, and render it in real time, which allows the user to listen to an announcement typically indicating the date and time of the last call, as well as the number of the last calling party and the indication of a command to be performed if the user wishes to call this last calling party. This announcement is typically rendered for a duration on the order of 10 seconds.

The user performs the indicated command and the calling device 10 ceases to render the first media stream MS4, for example after having received a second message 810 sent by the server 40.3 comprising a PEM header having an attribute parameter a=inactive.

The server 40.3 extends or routes the call request toward the recipient's network, the recipient having the simultaneous call forwarding service implemented by a server 40.5 (managing "terminating operator services", typically a "TAS" server). The server 40.5 sends a third "SIP 183 In Progress"-type message 820, comprising a first degree of priority of value 0.7 associated with a second media stream MS5, typically about 1 second after the end of the rendering of the first stream MS4.

Upon receipt of this third message 820, the calling device 10 sends an RTP2 packet toward the server 40.5, in order to create a NAPT entry that allows receiving the second stream MS5.

The calling device 10 further calculates a second recording duration D2 from the second degree of priority P2 obtained from the search in the third message 820. The second duration D2 being of 0.3 seconds, the calling device 10 then records the streams received during this duration of 0.3 seconds.

Concurrently, the server 40.5 sends three INVITE requests to three called devices 30.4, 30.5 and 30.6 corresponding to the last calling party, and the calling device 10 receives the second stream MS5.

At the end of the second recording duration D2, the calling device 10 renders the second stream MS5, because only this second stream MS5 has been stored. The user then listens to an announcement, typically intended to keep him waiting.

The device 40.5 receives a "SIP 180 Ringing"-type message 830 sent by the first called device 30.4, then can send a message 840 comprising a PEM header having a parameter a=inactive to the calling device 10 so that the latter ceases the rendering of the second stream MS5.

The translation device 40.4 also transfers the "SIP 180 Ringing"-type message 830 to the calling device 10, which calculates a third recording duration D3. As the "SIP 180 Ringing"-type message 830 does not comprise a first degree of priority, the calling device 10 then obtains a second degree of priority P2 associated with a fourth media stream MS6 pre-recorded in the read-only or random access memory of the calling device 10, this second degree of priority P2 having a predetermined value of 0.0. The calling device 10 therefore begins the third recording, the third duration D3 of this recording being of 1.0 second.

The calling device 10 concurrently receives a "SIP 183 In Progress"-type message 850 sent by the second called device 30.6, comprising a first degree of priority of 0.75 associated with a fourth media stream MS7, and sends an RTP3 packet toward the second called device 30.6, in order to create a NAPT entry that allows receiving the fourth stream MS7. The calling device 10 then receives the fourth stream MS7, and records it.

At the end of the third recording duration D3, the calling device 10 selects and renders the fourth stream MS7, because the fourth stream MS7 is associated with a second degree of priority P2 greater than the second degree P2 associated with the third stream MS6. The user then typically listens to a waiting time announcement, which may indicate that all the correspondents are busy.

The calling device 10 concurrently receives a "SIP 183 In Progress"-type message 860 sent by the third called device 30.5, comprising a first degree of priority of 0.85 associated with a fifth media stream MS8, and sends an RTP4 packet toward the third called device 30.5, in order to create a NAPT entry that allows receiving the fifth stream MS8. The calling device 10 then receives the fifth stream MS8, and records it, because this fifth stream MS8 could be rendered in place of the fourth stream MS7 if the calling device 10 ceases rendering the fourth stream MS7.

FIG. 9 represents, in the form of a flowchart, the main steps of a method for managing at least one media stream intended to be rendered by a calling device (such as the calling device 10 of FIG. 2) before the finalization of the establishment of a communication, according to an exemplary embodiment of the invention.

This method can be implemented by a system comprising a called device 30 and/or an intermediate network equipment 40 able to send a message comprising an indication of the presence of a media stream, for example a called device 30 and/or an intermediate network equipment 40 represented in FIG. 2.

The called device 30 has the hardware architecture of a computer. It includes in particular a processor, a read-only memory, a random access memory and a non-volatile flash memory (not represented) as well as communication means 32 through which it is linked to the communication network 20.

Likewise, the intermediate network equipment 40 has the hardware architecture of a computer. It includes in particular a processor, a read-only memory, a random access memory and a non-volatile flash memory (not represented) as well as communication means 42 through which it is linked to the communication network 20.

For each media stream managed by the system, the called device 30 or the intermediate network equipment 40 determines, in a step 910, a first degree of priority P1.

This determination is made for example following the receipt (step 900) of a request to establish a communication, such as the INVITE request sent in the sending step 100 of the method of FIG. 1.

The first degree of priority P1 is typically determined according to the importance of the associated media stream and/or the network distance between the calling device 10 and a network device associated with said stream, typically a network device sending the media stream to the calling device 10, this network device possibly being the called device 30.

The network distance between the calling device 10 and the network device associated with the stream is for example the number of hops/nodes between these two network equipments, that is to say the number of equipments through which a packet travels to go from the calling device 10 to the network device associated with the stream.

The network distance between the calling device 10 and the network device associated with the stream can correspond to the number of SIP dialogues between the calling device 10 and a network device associated with the stream. A SIP dialogue is present between two SIP agents ("User Agent SIP"), a SIP agent being located in the calling 10 and called 30 devices then within each SIP network equipment implementing a "back2back User Agent" or "B2BUA" function, that is to say two head-to-tail agents. Such a function can be for example in an A-SBC, I-SBC (Interconnect Session Border Controller) or TAS (Telephony Application Server) device.

Another possibility, for the SIP protocol, is that the network distance corresponds to the number of SIP nodes between the calling device 10 and a network device associated with the stream. Each SIP node crossed and forwarding the SIP request with or without modification (B2BUA, Proxy, User Agent) decrements by 1 the value of the SIP MAX-FORWARD header, the calling device 10 increasing this value to 70 in accordance with the SIP standard defined by the RFC3261 at the IETF.

The first degree of priority P1 is for example determined so that the greater the network distance, the smaller the value of the first degree of priority P1.

The value of the first degree of priority P1 associated with a server 40 linked to a service concerning the calling device 10 (called "originating operator service"), for example a TAS (Telephony Application Server) network equipment or MRF can be greater than the value of the first degree of priority associated with an equipment 40 of interconnection of an ISUP (ISDN User Part, where "ISDN" is the acronym for Integrated Services Digital Network) or BICC (Bearer Independent Call Control) network, such as an MGCF (Media Gateway Control Function) equipment or an MGW (Media Gateway) equipment.

In addition, the value of the first degree of priority associated with an equipment 40 of interconnection of an ISUP or BICC network may be greater than the value of the first degree of priority P1 associated with an equipment 40 of interconnection of a VoIP network, such as an I-SBC (Interconnect Session Border Controler) or NBI (Network Border Interconnect) equipment.

In addition, the value of the first degree of priority P1 associated with an equipment 40 of interconnection of a VoIP network may be greater than the value of the first degree of priority P1 associated with a server 40 linked to a service concerning the called device 30 (called "terminating operator service"), for example TAS or MRF network equipment.

In addition, the value of the first degree of priority P1 associated with a server 40 linked to a service concerning the called device 30 may be greater than the value of the first degree of priority P1 associated with the called device 30.

The value of the first degree of priority P1 is for example comprised between:
  0.9 and 1.0 when the first degree of priority P1 is associated with a server 40 linked to a service concerning the calling device 10,
  0.8 and 0.9 when the first degree of priority P1 is associated with an equipment 40 of interconnection of an ISUP or BICC network,
  0.7 and 0.8 when the first degree of priority P1 is associated with an equipment 40 of interconnection of a VoIP network,
  0.4 and 0.7 when the first degree of priority P1 is associated with a server 40 linked to a service concerning the called device 30,
  0.2 and 0.4 when the first degree of priority P1 is associated with a server 40 linked to a service concerning a set of devices comprising the called device 30, and/or
  0.0 and 0.2 when the first degree of priority P1 is associated with the called device 30.

As shown in FIG. 10, the first degree of priority P1 can also be determined so that the greater the network distance, the greater the value of the first degree of priority P1. FIG. 10 illustrates other examples of network distance, for various network equipments 30, 40. As shown in this figure:
  a calling device-type or "TAS Originating"-type network equipment controlling an MRF can be associated with a first degree of priority of a value equal to 0.0,
  an MGCF-type network equipment controlling an MGW can be associated with a first degree of priority of a value equal to 0.1,
  a NBI-type network equipment can be associated with a first degree of priority of a value equal to 0.2,
  a called device-type or "TAS Terminating"-type network equipment controlling an MRF can be associated with a first degree of priority of a value equal to 0.3, and/or
  a called device-type equipment can be associated with a first degree of priority of a value equal to 1.0.

Then, in a step 920 and for each determined first degree of priority P1, the first degree of priority P1 is sent by the called device 30 or the intermediate network equipment 40, in a message to the calling device 10.

The message sent is for example received by the calling device 10 in the receipt step 110.

The message can thus be a signaling message indicating the presence of a media stream, for example of the "SIP 183 In Progress" type or "SIP 180 Ringing" type, or a control packet, for example an APP-type RTCP packet.

More specifically, when the message is of the "SIP 183 In Progress" or "SIP 180 Ringing" type, the first degree of priority P1 is inserted in a P-Early-Media (PEM) header of the message.

In the case where a media stream is sent to the calling device 10, an SSRC identifier, possibly present in an RTP packet header identifying the media stream, can also be inserted in the PEM header of the signaling message, so that the calling device 10 can associate the message with the media stream.

The intermediate network equipment 40 sending the media stream (for example an MRF-type media server) can be controlled by a signaling server (for example a telephone application server TAS). The signaling server reserves a resource on this intermediate network equipment 40. The intermediate network equipment 40 returns to the signaling server the IP address and the reserved port following the resource reservation request, so that they are inserted in the signaling message, as well as the SSRC associated with the media stream so that it is also inserted in a signaling message.

The value of the first degree of priority P1 can then be modified by another network equipment receiving the message, typically a network interconnection equipment.

The called device 30 or the intermediate network equipment 40 can further send the media stream associated with the first degree of priority.

The invention further relates to a method for managing a plurality of media streams intended for to be rendered by a calling device 10 before the finalization of the establishment of a communication, comprising step 100, 110, 130, 132, 134, 136 and/or 140 of the management method described with reference to FIG. 1, as well as step 900, 910 and/or 920 of the management method described with reference to FIG. 9.

The steps of this method are for example implemented by a system comprising a calling device 10, a called device 30 and/or an intermediate network equipment 40, such as the calling device 10, a called device 30 and/or an intermediate network equipment 40 described with reference to FIG. 2.

The invention claimed is:

1. A method of managing a plurality of media streams intended to be rendered by a calling device before finalizing an establishment of a communication, the method implemented by the calling device prior to the finalization of the establishment of the communication, the method comprising:
   sending a request to at least one called device to establish the communication between the calling device and the at least one called device,
   for each media stream of a plurality of media streams:
      receiving a message in response to the request to establish the communication, and
      obtaining a second degree of priority associated with the media stream, a value of the second degree of priority being dependent upon the presence or the absence of a first degree of priority associated with the media stream in the received message,
   selecting a media stream in order to render the media stream, the media stream being selected from among said plurality of media streams, as a function of second degrees of priority associated with the media streams of the plurality of media streams; and
   rendering the selected media stream.

2. The method of claim 1, wherein, for each media stream of the plurality of media streams:
   the second degree of priority obtained is the first degree of priority if the first degree of priority is present in the received message,
   the second degree of priority obtained is a default degree of priority if a first degree of priority is not present in the received message.

3. The method of claim 1, wherein selecting a media stream comprises comparing the second degrees of priority associated with the media streams of the plurality of media streams, a media stream being selected according to the result of the comparison.

4. The method of claim 3, wherein:
   selecting a media stream comprises obtaining a second degree of priority associated with a first media stream of the plurality of media streams, following the receipt of a first message received in response to the request to establish the communication, the method further comprising rendering of the first media stream after obtaining the second degree of priority associated with the first media stream, and
   selecting a media stream further comprises, during the rendering of the first media stream, obtaining a second degree of priority associated with a second media stream of the plurality of media streams, following the receipt of a second message received in response to the request to establish the communication, the method further comprising, if the second degree of priority of the second media stream is higher than the second degree of priority of the first media stream, interrupting the rendering of the first media stream and rendering the second stream media, in place of the first media stream.

5. The method of claim 1, wherein receiving the message in response to the request to establish the communication comprises receiving a signaling message associated with a media stream of the plurality of media streams.

6. The method of claim 1, wherein receiving the message in response to the request to establish the communication comprises receiving a control packet associated with a media stream of the plurality of media streams.

7. The method of claim 1, further comprising:
   receiving a third message received in response to the request to establish the communication,
   recording, in a memory of the calling device, for a predetermined duration starting upon receipt of the third message, at least one stream of the plurality of media streams, the media stream being received by the calling device,
   wherein the media stream is selected when the predetermined duration has elapsed.

8. The method of claim 7, wherein the predetermined duration depends on the value of the second degree of priority obtained.

9. The method of claim 7, further comprising rendering the selected media stream, the rendering being accelerated so that the duration of the rendering process is reduced by the predetermined duration.

10. A calling device comprising a processor and a memory, the calling device configured to implement a method for managing a plurality of media streams intended to be rendered by a calling device before finalizing an establishment of a communication, the method implemented by the calling device prior to the finalization of the establishment of the communication, the method comprising:
   sending a request to at least one called device to establish the communication between the calling device and the at least one called device,
   for each media stream of a plurality of media streams:
      receiving a message in response to the request to establish the communication, and
      obtaining, a second degree of priority associated with the media stream, a value of the second degree of priority being dependent upon the presence or the absence of a first degree of priority associated with the media stream in the received message,
   selecting a media stream in order to render the media stream, the media stream being selected from among said plurality of media streams, as a function of second degrees of priority associated with the media streams of the plurality of media streams, the second degrees of priority being obtained according to the result of the search; and
   rendering the selected media stream.

11. A method for managing at least one media stream intended to be rendered by the calling device of claim 10, the method comprising:
   for each of the at least one stream, determining the associated first degree of priority,
   for each first degree of priority determined, sending the first degree of priority in a message to the calling device.

12. The method of claim 11, wherein for each of the at least one stream, the first degree of priority is determined as a function of the network distance between the calling device and a network device associated with the stream.

13. A system for managing at least one media stream intended to be rendered by the calling device of claim 10, the system configured to:
for each of the at least one stream, determine the associated first degree of priority,
for each first degree of priority determined, send the first degree of priority in a message to the calling device.

14. A computer comprising a processor and a memory, the memory having stored thereon instructions which, when executed by the processor, cause the computer to implement a method comprising:
sending a request to at least one called device to establish the communication between the calling device and the at least one called device,
for each media stream of a plurality of media streams, receiving a message in response to the request to establish the communication, and obtaining, a second degree of priority associated with the media stream, a value of the second degree of priority being dependent upon the presence or the absence of a first degree of priority associated with the media stream in the received message, a second degree of priority associated with the media stream,
selecting a media stream in order to render the media stream, the media stream being selected from among said plurality of media streams, as a function of second degrees of priority associated with the media streams of the plurality of media streams; and
rendering the selected media stream.

15. A non-transitory, computer-readable medium having stored thereon instructions which, when executed by a processor, cause the processor to implement a method comprising:
sending a request to at least one called device to establish the communication between the calling device and the at least one called device,
for each media stream of a plurality of media streams, receiving a message in response to the request to establish the communication, and obtaining, a second degree of priority associated with the media stream, a value of the second degree of priority being dependent upon the presence or the absence of a first degree of priority associated with the media stream in the received message, a second degree of priority associated with the media stream,
selecting a media stream in order to render the media stream, the media stream being selected from among said plurality of media streams, as a function of second degrees of priority associated with the media streams of the plurality of media streams; and
rendering the selected media stream.

16. The method of claim 1, further comprising determining whether a first degree of priority is associated with the media stream in the received message.

17. The calling device of claim 10, wherein the method implemented by the calling device further comprises determining whether a first degree of priority is associated with the media stream in the received message.

* * * * *